United States Patent
Seigel et al.

(10) Patent No.: US 9,637,027 B2
(45) Date of Patent: May 2, 2017

(54) DEVICE FOR LOCKING A VEHICLE SEAT

(75) Inventors: Juergen Seigel, Schutterwald (DE);
Johannes Obrecht, Oberkirch (DE);
Andreas Rohlfing, Minden (DE);
Andreas Schwartz, Bueckeburg (DE)

(73) Assignee: PROGRESS-WERK OBERKIRCH AG, Oberkirch (DE)

( * ) Notice: Subject to any disclaimer, the term of this patent is extended or adjusted under 35 U.S.C. 154(b) by 1735 days.

(21) Appl. No.: 12/477,475

(22) Filed: Jun. 3, 2009

(65) Prior Publication Data

US 2009/0324325 A1 Dec. 31, 2009

Related U.S. Application Data

(63) Continuation of application No. PCT/EP2007/009746, filed on Nov. 10, 2007.

(30) Foreign Application Priority Data

Dec. 4, 2006 (DE) .......................... 10 2006 058 891

(51) Int. Cl.
*B25G 3/18* (2006.01)
*F16B 21/00* (2006.01)
(Continued)

(52) U.S. Cl.
CPC ....... *B60N 2/01583* (2013.01); *Y10T 403/581* (2015.01); *Y10T 403/591* (2015.01)

(58) Field of Classification Search
USPC ......... 403/321, 322.1, 325, 326, 327, 322.3; 297/344.1, 378.12, 378.13; 292/194, 216,
(Continued)

(56) References Cited

U.S. PATENT DOCUMENTS 4,765,682 A    8/1988  Satoh
5,348,373 A *  9/1994  Stiennon ................... 297/344.1
(Continued)

FOREIGN PATENT DOCUMENTS

DE    44 39 644 A1    6/1995
DE    296 15 132 U1   10/1996
(Continued)

OTHER PUBLICATIONS

International Preliminary Report on Patentability from PCT/EP2007/009746 dated Aug. 26, 2009.

*Primary Examiner* — Daniel P. Stodola
*Assistant Examiner* — Nahid Amiri
(74) *Attorney, Agent, or Firm* — Marshall, Gerstein & Borun LLP

(57) ABSTRACT

A device for locking a vehicle seat has a pawl which can be pivoted about a first pivot axis and, in a closed position, is in engagement with a positionally fixed fitting and, in an open position, is free from the fitting, wherein the pawl has a first clamping surface, furthermore a locking element for locking the pawl in the closed position, which locking element can be pivoted about a second pivot axis and has a second clamping surface which, in a locking position, bears against the first clamping surface and, in the process, keeps the pawl in the closed position, and, in an unlocking position, is free from the first clamping surface, and an actuating element which interacts with the locking element in order to transfer the locking element into the unlocking position. A stop is provided for the actuating element in such a manner that, upon action of a torque exerted by the pawl on the locking element, the actuating element interacts in a blocking manner with the stop and blocks the further movement of the locking element before the latter reaches the unlocking position. In the region of the second clamping surface, the locking element has a material which is softer than a (Continued)

material which the pawl has in the region of the first clamping surface, and the pawl has a projection on which the first clamping surface is at least partially formed.

8 Claims, 6 Drawing Sheets

(51) Int. Cl.
*F16D 1/00* (2006.01)
*B60N 2/015* (2006.01)

(58) Field of Classification Search
USPC .................................................. 292/DIG. 23
See application file for complete search history.

(56) References Cited

U.S. PATENT DOCUMENTS

| | | | |
|---|---|---|---|
| 5,681,086 A | 10/1997 | Baloche | |
| 5,695,247 A * | 12/1997 | Premji | 297/341 |
| 5,730,480 A * | 3/1998 | Takamura | 248/503.1 |
| 5,904,403 A * | 5/1999 | Unckrich | 297/378.12 |
| 6,629,710 B1 * | 10/2003 | Shafry et al. | 292/216 |
| 6,715,841 B2 * | 4/2004 | Christoffel et al. | 297/463.1 |
| 6,742,845 B2 * | 6/2004 | Nock | 297/378.11 |
| 6,805,410 B2 * | 10/2004 | Christoffel et al. | 297/378.12 |
| 6,893,093 B2 * | 5/2005 | Nock et al. | 297/367 R |
| 6,902,237 B2 * | 6/2005 | Petry | 297/344.15 |
| 7,044,552 B2 | 5/2006 | Muller et al. | |
| 7,077,471 B2 * | 7/2006 | Schumann et al. | 297/216.1 |
| 7,140,683 B2 * | 11/2006 | Rausch et al. | 297/341 |
| 7,188,906 B2 | 3/2007 | Christoffel et al. | |
| 7,287,814 B2 * | 10/2007 | Heimann et al. | 297/367 R |
| 2004/0108762 A1 | 6/2004 | Borbe et al. | |
| 2006/0200179 A1 * | 9/2006 | Barker et al. | 606/157 |
| 2006/0208505 A1 | 9/2006 | Christoffel et al. | |

FOREIGN PATENT DOCUMENTS

| | | |
|---|---|---|
| DE | 696 00 369 T2 | 11/1998 |
| DE | 201 14 209 U1 | 3/2002 |
| DE | 100 48 127 A1 | 4/2002 |
| DE | 10121020 A1 * | 11/2002 |
| DE | 103 04 574 A1 | 8/2004 |
| DE | 103 05 177 A1 | 8/2004 |
| DE | 10 2004 001 766 B3 | 5/2005 |
| EP | 1 033 279 A1 | 9/2000 |
| EP | 1033279 A1 * | 9/2000 |
| EP | 1 334 866 A2 | 8/2003 |
| EP | 1 474 307 A1 | 11/2004 |
| WO | WO 2005037596 A2 * | 4/2005 |

* cited by examiner

DEVICE FOR LOCKING A VEHICLE SEAT

CROSS REFERENCE TO RELATED APPLICATIONS

The present application is a continuation of International Patent Application PCT/EP 2007/009746 filed on Nov. 10, 2007 designating the United States, which was published in the German language and claims priority of German Patent Application No. 10 2006 058 891.6 filed on Dec. 4, 2006. The entire contents of these applications are incorporated herein by reference.

BACKGROUND OF THE INVENTION

The invention generally relates to devices for locking a vehicle seat.

More specifically, the invention relates to a device for locking a vehicle seat of the type comprising a pawl which can be pivoted about a pivot axis and, in a closed position, is in engagement with a positionally fixed fitting and, in an open position, is free from the fitting, and a locking element for locking the pawl in the closed position.

Without limiting the general character, the locking device mentioned at the beginning can be used for anchoring a vehicle seat on the floor or for locking a pivotable backrest of a vehicle seat.

However, the preferred use of the locking device according to the present invention is the anchoring of a vehicle seat on the floor.

In the case of the locking device being used for anchoring a vehicle seat on the floor, the positionally fixed fitting with which the pawl is in engagement in its closed position is, for example, a bolt which is fixed on the vehicle body and is engaged around by a mouth of the pawl in the closed position of said mouth. The locking element serves to securely lock and, if appropriate, to clamp the pivotable pawl in its closed position. In order to transfer the pawl into its open position, an actuating element is provided which serves to transfer the locking element from its locking position into its unlocking position, after which the pawl is moved into the open position, customarily automatically by means of spring prestressing.

In particular the following two demands are imposed on locking devices of this type. Firstly, the pawl must not automatically open during the operation of the vehicle in which the vehicle seat is installed. However, in the event of an impact of the vehicle during an accident, high forces may act on the pawl and may exert a torque on the pawl in the direction of its open position. The locking element has to counteract an opening torque of this type in order to securely hold the pawl in its closed position. This can be ensured, for example, by the clamping surface of the pawl being in engagement under self-locking with the clamping surface of the locking element.

The second demand imposed on locking devices of this type is that it is easily actuable for the intended opening of the pawl. However, the previously mentioned self-locking of the engagement of the two clamping surfaces of the pawl and of the locking element counteracts such a smooth-running actuation of the locking element for opening the pawl, and therefore a construction of the locking device with self-locking bearing of the clamping surface of the locking element against the clamping surface of the pawl is only partly suitable. In addition, the self-locking depends on the surface state of the two clamping surfaces and may be reduced or even eliminated, for example by means of soiling or lubricants, such that, in the event of an impact, the remaining of the pawl in the closed position solely on the basis of an self-locking frictional connection cannot always be ensured.

In order to eliminate this problem, in the case of a locking device according to DE 44 39 644 C2, the locking element is provided, in addition to the clamping surface, with a catching surface which, upon bearing against the clamping surface of the pawl, prevents the pawl from exerting an opening torque on the locking element. For this purpose, the catching surface is designed in such a manner that it runs parallel to a displacement section between an axis of curvature of the clamping surface of the locking element and the pivot axis of the locking element. The catching surface is accordingly a planar surface with a 0° pitch with respect to the pivot axis of the locking element.

In order to ensure the smooth-running of the known locking device during intentional opening, the clamping surface of the locking element bears without self-locking against the clamping surface of the pawl in the locking position.

In a first embodiment of the known locking device, the locking element is designed as a single part, and the catching surface and the clamping surface of the locking element are arranged one behind the other in the circumferential direction about the pivot axis. In another embodiment of the known locking device, the locking element is designed as two parts, with the one part of the locking element only having the clamping surface and the other part of the locking element only having the catching surface. The two parts are coupled to each other with a movement clearance in the pivoting direction of the locking element via a pin and slot connection. The catching surface of the one part of the locking element is oriented with respect to the clamping surface of the other part of the locking element in such a manner that, in the correct closed position of the pawl, only the clamping surface of the locking element bears against the clamping surface of the pawl, and, in the event of an impact, if the clamping surface of the locking element comes out of contact with the clamping surface of the pawl, only the catching surface of the other part of the locking element bears against the clamping surface of the pawl in order to prevent further opening of the pawl.

The configuration of the known locking device with a locking element, the clamping surface of which bears against the clamping surface of the pawl without self-locking, has the disadvantage that, in order to compensate for play, so as to avoid rattling of the device during operation, a sufficiently large counterforce always has to be produced in order to keep the device, i.e. more precisely the pawl, closed, which has to be realized, for example, by means of a sufficiently high spring force.

The device which is known from the document DE 100 48 127 A1 has an actuating element, which is referred to there as a switching plate, for unlocking the pawl, with the switching plate being formed integrally with the locking element. In the event that the pawl exerts an opening torque on the locking element during an impact, the switching plate runs against a stop, as a result of which further opening of the pawl is avoided. In this case, the stop against which the switching plate runs has to absorb virtually the entire opening torque occurring during the impact because the pawl continuously exerts an opening torque on the locking element. Accordingly, the stop has to be designed for absorbing very high forces, but, due to the fact that the stop has to absorb all of the opening forces, this cannot always be ensured or ensured to an adequate degree.

SUMMARY OF THE INVENTION

The invention is based on the object of developing a device for locking a vehicle seat of the type mentioned at the beginning to the effect that the impact resistance of the device is improved while ensuring smooth-running during intended opening of the pawl.

According to the invention, this object is achieved by a device for locking a vehicle seat, comprising a pawl pivotable about a first pivot axis and, in a closed position, being in engagement with a positionally fixed fitting and, in an open position, being free from the fitting, the pawl having a projection on which a first clamping surface is at least partially formed, the projection having a first material, a locking element for locking the pawl in the closed position, the locking element being pivotable about a second pivot axis and having a second clamping surface which, in a locking position, bears against the first clamping surface and, thereby, keeps the pawl in the closed position, and, in an unlocking position, is free from the first clamping surface, the locking element, in the region of said second clamping surface, having a second material which is softer than the first material which the pawl has in the region of the first clamping surface, an actuating element interacting with the locking element in order to transfer the locking element into the unlocking position, a stop provided for the actuating element in such a manner that, upon action of a torque exerted by the pawl on the locking element, the actuating element interacts in a blocking manner with the stop and blocks further movement of the locking element before the locking element reaches the unlocking position.

The locking device according to the invention proceeds from the concept of the known locking device of providing a catching surface and a clamping surface on the locking element. As a result, lower demands are imposed on the locking element according to the invention with regard to the manufacturing tolerances. The nevertheless high impact resistance of the locking device according to the invention is now ensured at least also by means of the actuating element in conjunction with the stop. If, in the event of an impact, the pawl exerts a torque on the locking element, which torque acts in the direction of the unlocking position of the locking element, the locking element, during its opening pivoting movement, carries along the actuating element which then, after a short pivoting distance of the locking element, runs against the stop and blocks the further pivoting movement of the locking element. At this point, the clamping surfaces of the locking element and of the pawl are still in contact with each other, and the opening torque which continues to be exerted on the locking element by the pawl does not lead to a further opening movement of the locking element, but rather the clamping surfaces of the locking element and of the pawl come into contact even more intimately with each other, which is especially assisted by the projection on the pawl and the softer material of the locking element in the region of the clamping surface. In this case, the forces are partially absorbed by the stop and partially by the clamping surfaces and are therefore distributed favorably over a plurality of points of the locking device. In the event of an impact, the clamping surface of the pawl can very intimately become wedged with or buried into the clamping surface of the locking element, in particular in the pivoting position of the locking element, in which the actuating element is in contact with the stop, thus avoiding further pivoting of the locking element in the direction of its unlocking position. Owing to the fact that the locking element is softer in the region of the second clamping surface than the pawl in the region of the first clamping surface, the projection of the pawl can bore into the clamping surface of the locking element in the event of high opening torques which the pawl may exert on the locking element in the event of an impact, as a result of which, in the event of an impact, a form-fitting connection is produced between the clamping surface of the locking element and the clamping surface of the pawl, said form-fitting connection reliably avoiding opening of the pawl in the event of an impact.

In a preferred configuration, the actuating element has a limited movement clearance relative to the locking element such that, upon actuation of the actuating element in order to unlock the locking element, said actuating element, after executing a relative movement limited by the movement clearance, runs past the stop, carrying along the locking element.

For the intentional opening of the pawl, the actuating element is accordingly actuated, which first of all brings about a relative movement between the actuating element and the locking element, to be precise by the limited movement clearance, as a result of which the actuating element is displaced relative to the fixed stop in such a manner that, upon further movement of the actuating element, said actuating element runs past the stop, carrying along the locking element, and can therefore transfer the locking element completely into the unlocking position. The smooth-running of the locking device according to the invention is therefore likewise provided.

In a preferred configuration, the actuating element is connected to the locking element at a connecting point outside the second pivot axis.

It is advantageous in this case that, during an intended opening of the pawl, a sufficient torque can be exerted by the actuating element on the locking element in order to transfer the locking element into the unlocking position, as a result of which the locking device according to the invention can be opened smoothly.

In a further preferred configuration, the actuating element can be pivoted about a third pivot axis, the third pivot axis being formed by the connecting point to the locking element.

While the relative movement between the actuating element and the locking element can also be provided by means of a connection permitting a translatory movement between the actuating element and the locking element, the abovementioned configuration has the advantage of guidance, which can be realized more easily, of the actuating element during its movement relative to the locking element.

In order to ensure the limited movement clearance between the actuating element and the locking element, the actuating element preferably has a section, for example a section with an eye or a mouth, which, in order to produce the movement clearance, sits with a clearance on a bearing pin of the locking element, which bearing pin forms the second pivot axis.

It is advantageous in this case that the limited movement clearance between the actuating element and the locking element can be brought about with few additional parts. In the event of the abovementioned section having an eye or mouth which sits on the bearing pin of the locking element, said eye or mouth has a cross-sectional shape which makes it possible for the eye to sit on the bearing pin with a clearance.

In a further preferred configuration, the actuating element is prestressed into the inoperative position.

This measure advantageously ensures that, in the closed position of the pawl and therefore in the locked state of the vehicle seat, the actuating element always undertakes its function of limiting the pivoting distance of the locking element in the event of an impact. Only for the intended opening of the pawl is the actuating element then transferred, counter to its prestressing, into its second functional position at which the actuating element runs past the stop in order to ensure complete unlocking of the locking element.

Further advantages and features emerge from the description below and the attached drawing.

It goes without saying that the features mentioned above and those which have yet to be explained below can be used not only in the respectively stated combination, but also in different combinations or on their own without departing from the scope of the present invention.

BRIEF DESCRIPTION OF THE DRAWINGS

An exemplary embodiment of the invention is illustrated in the drawing and is described in more detail below with reference thereto. In the drawing.

DETAILED DESCRIPTION OF A PREFERRED EXEMPLARY EMBODIMENT

FIGS. 1 to 6 illustrate a device, which is provided with the general reference number 10, for locking a vehicle seat. The device 10 serves in particular for anchoring a vehicle seat on the floor of a vehicle body.

Figure 1:
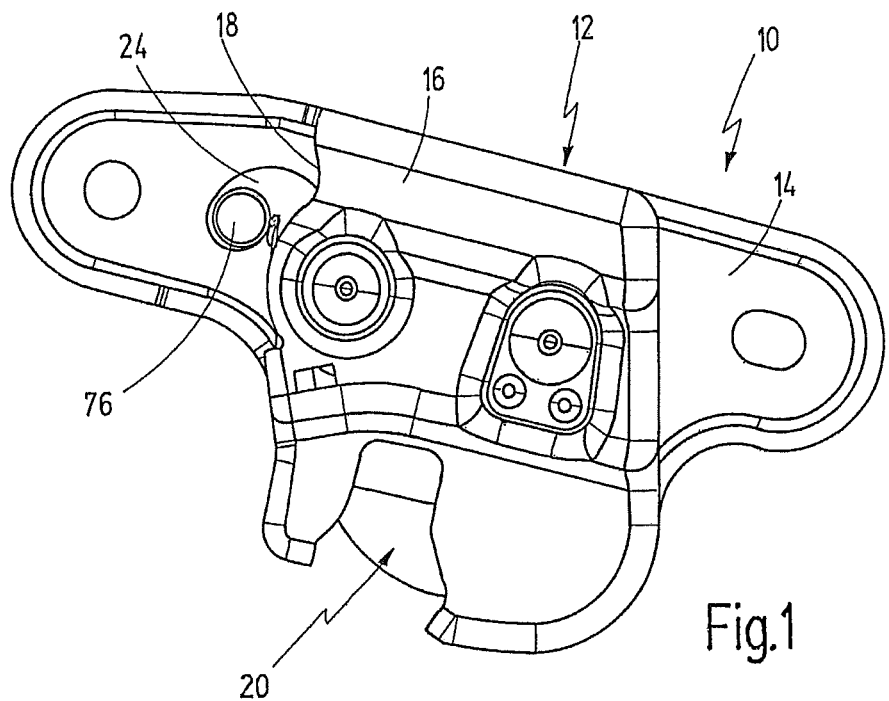
FIG. 1 shows a device for locking a vehicle seat, in a front view with a housing partially broken open.
Figure 2:
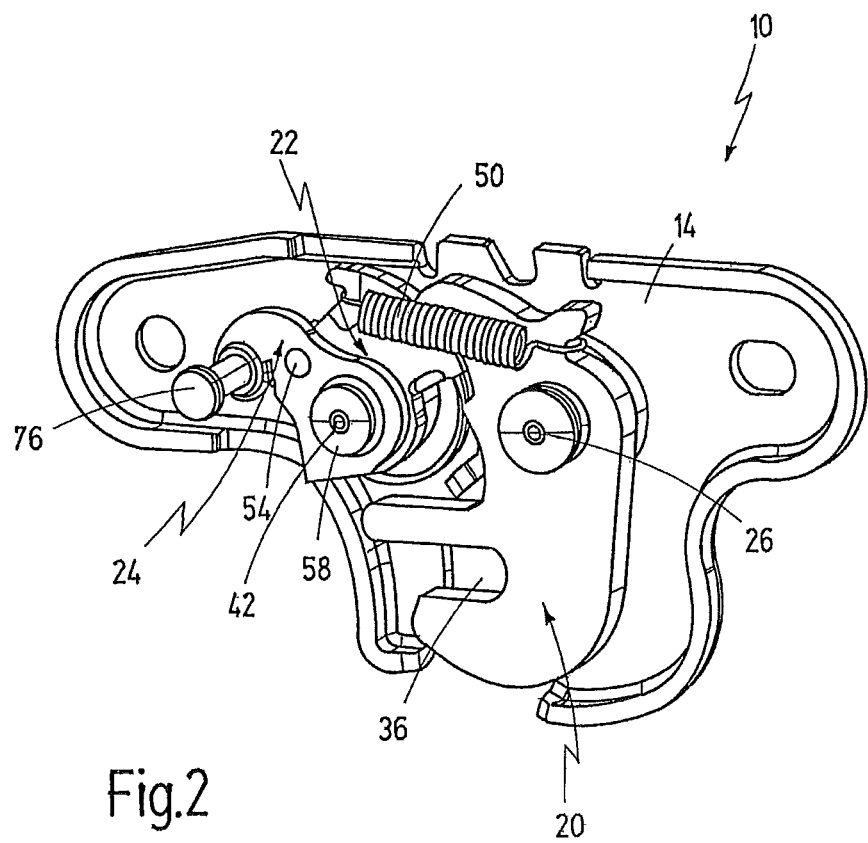
FIG. 2 shows the device in FIG. 1 with the housing opened.

FIG. 1 shows the device 10 with a housing 12 which has a housing part 14 and a housing part 16. The housing part 16 is illustrated broken away along an edge 18 in FIG. 1. FIG. 2 only illustrates the housing part 14 while the housing part 16 is omitted.

A pawl 20, a locking element 22 and an actuating element 24, which are described in more detail below, are arranged in the housing 12.

The pawl 20 can be pivoted about a pivot axis 26, as indicated by a double arrow 28.

Figure 3:
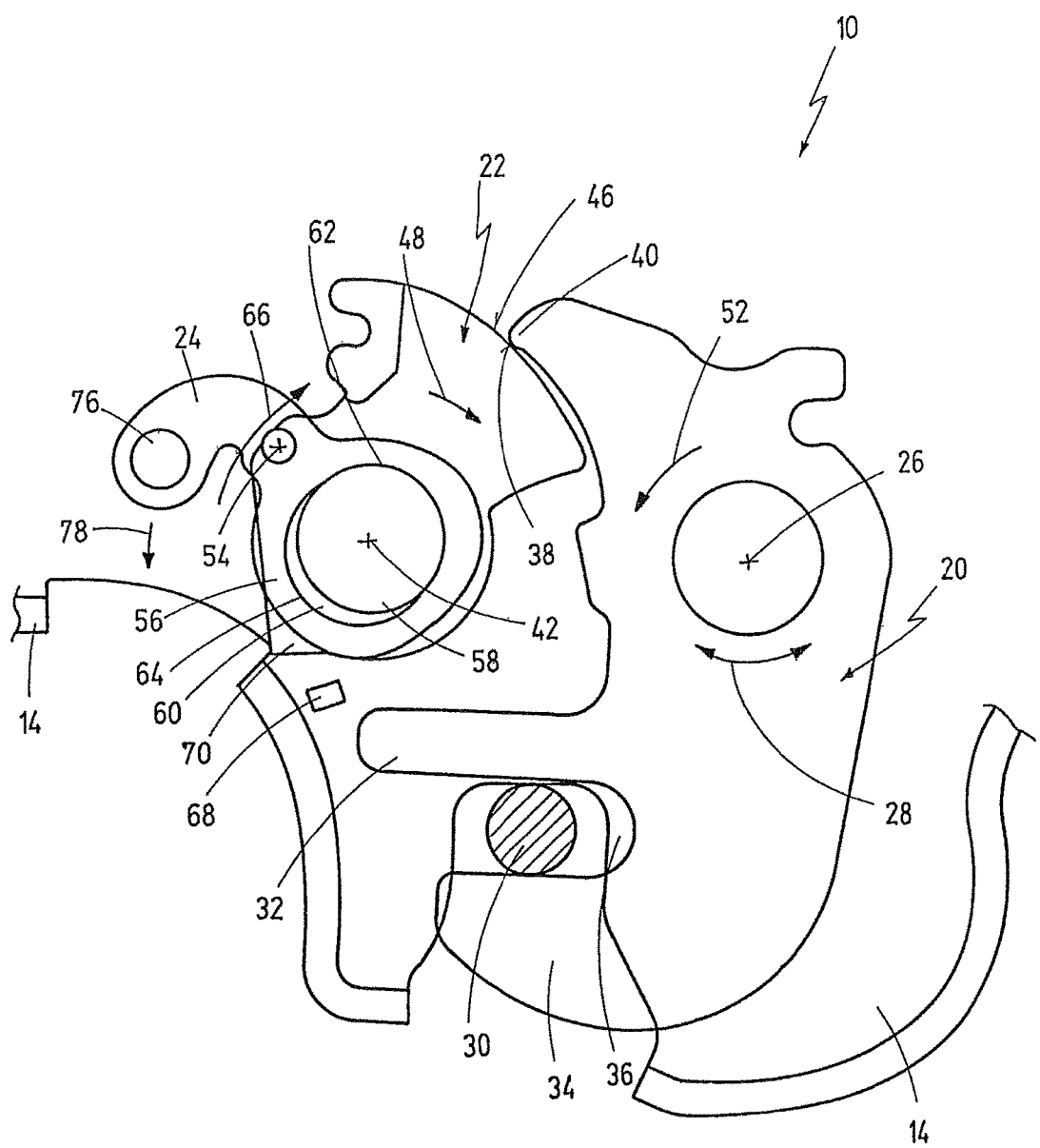
FIG. 3 shows the device in FIGS. 1 and 2 with continued omission of parts, in a schematic illustration, with FIG. 3 showing a first operating state of the device.

In its closed position shown, for example, in FIG. 3, the pawl 20 is in engagement with a positionally fixed fitting 30 (not illustrated in FIGS. 1 and 2). The fitting 30 is, for example, a bolt which is fixedly connected to the vehicle body and does not belong to the device 10. Corresponding to the configuration of the fitting 30 as a bolt, the pawl 20 is configured so as to have a mouth with two limbs 32, 34 and a recess 36 which is formed between the limbs 32 and 34, is open laterally and is in the manner of an elongated hole.

The pawl 20 furthermore has a clamping surface 38. The clamping surface 38 is formed here on a projection 40 of the pawl 20, with the projection 40 pointing approximately in the pivoting direction of the pawl 20 about the pivot axis 26.

Figure 6:
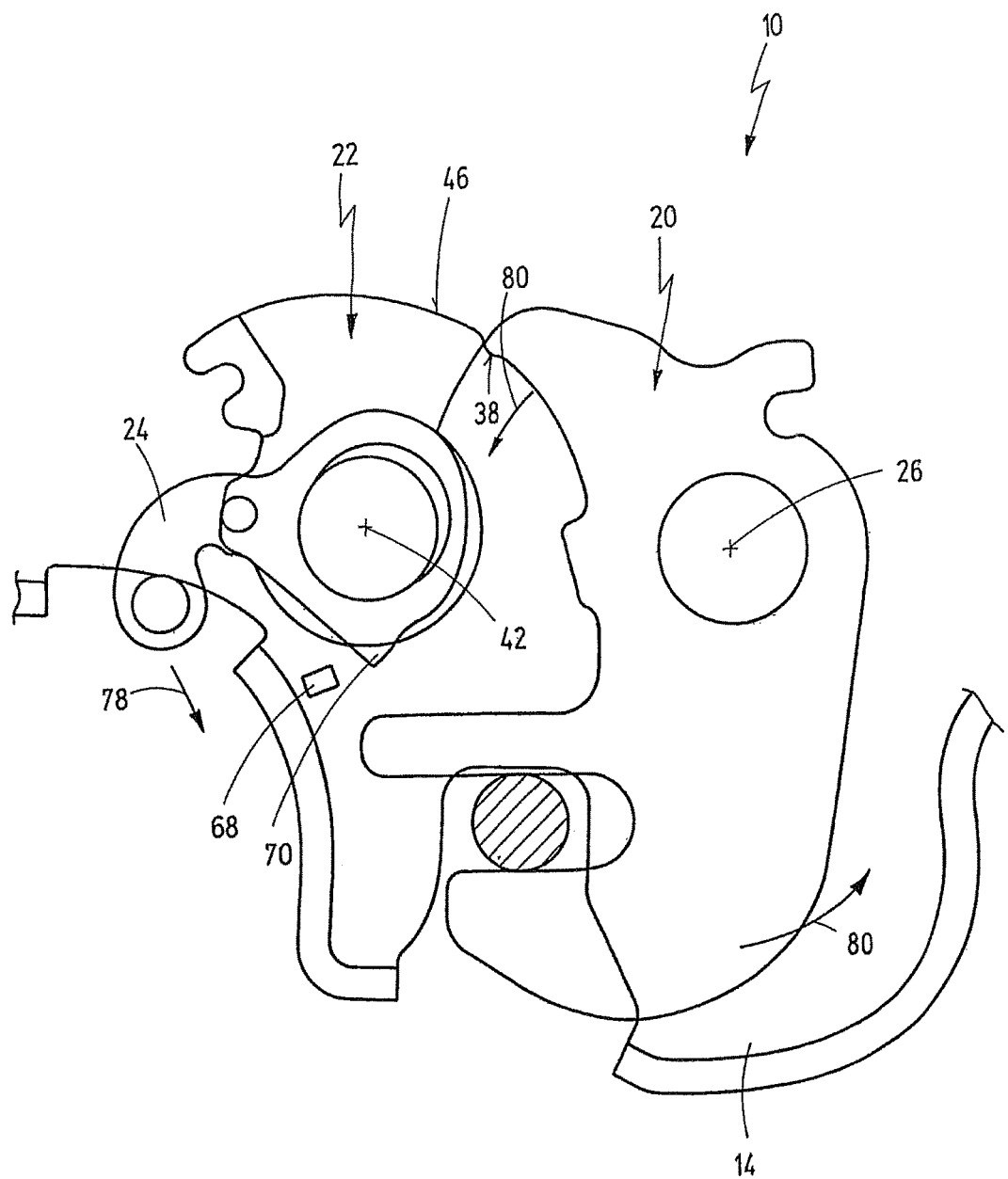
FIG. 6 shows a schematic illustration of the device in a further operating state.
Figure 7:
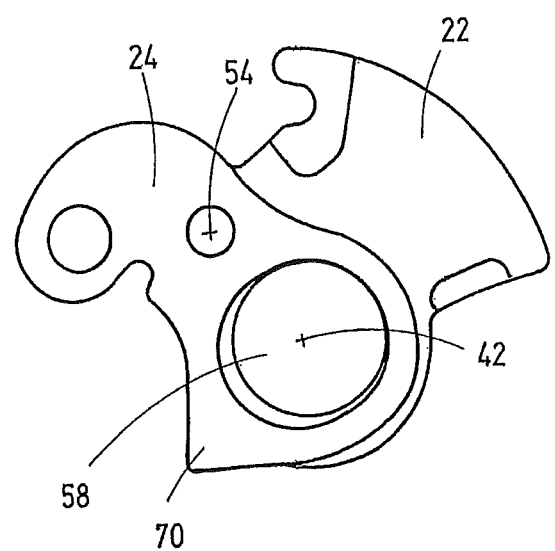
FIG. 7 shows the actuating element and the locking element of the device in FIGS. 1 to 6 on their own.

The locking element 22 can be pivoted about a pivot axis 42, which differs from the pivot axis 26, in accordance with a double arrow 44, to be precise between a locking position, which is shown in FIG. 3, and an unlocking position which is shown in FIG. 6.

The locking element 22 has a clamping surface 46 which, in the locking position of the locking element 22 that is shown in FIG. 3, bears against the clamping surface 38 of the pawl 20 and, in the process, holds the pawl 20 in the closed position of the pawl 20, which position is shown in FIG. 3. The clamping surface 46 is formed eccentrically with respect to the pivot axis 42 of the locking element 22, and therefore, as the pivoting of the locking element 22 increases in the direction of an arrow 48 in FIG. 3, the clamping of the pawl 20 in the closed position increases.

According to FIG. 2, the pawl 20 and the locking element 22 are prestressed toward each other by means of a spring 50, i.e. the spring 50 acts on the locking element 22 in the pivoting direction according to the arrow 48 and on the pawl 20 in the (opposite) pivoting direction according to an arrow 52. The spring 50 is not illustrated in FIGS. 3 to 6.

The actuating element 24 is coupled to the locking element 22, but is movable over a limited movement clearance relative to the locking element 22, as is further described below.

The actuating element 24 is mounted on the locking element 22 in a manner such that it can pivot about a pivot axis 54, with the pivoting movement of the actuating element 24 relative to the locking element 22 being limited to the abovementioned movement clearance. In order to limit the pivoting movement of the actuating element 24 relative to the locking element 22, the actuating element 24 has a section 56 which is designed in the form of an eye which sits on a pin 58 which is connected to the locking element 22 and forms the pivot axis of the locking element 22 centrally.

As emerges from FIGS. 3 to 6, the eye 60 is designed with respect to the outer circumference of the pin 58 in such a manner that the section 56 of the actuating element 24 sits with a clearance on the pin 58. When the actuating element is pivoted about the pivot axis 54, an eye section 62 (compare FIGS. 3 and 4) or an eye section 64 (compare FIGS. 5 and 6) therefore impacts on the pin 58, depending on the pivoting direction.

The pivoting angle of the actuating element 24 about the pivot axis 54 is preferably limited to a small angular range, preferably of less than 20°.

The actuating element 24 is prestressed into its inoperative position (illustrated in FIGS. 3 and 4) relative to the locking element 22, for example by means of a leg spring (not illustrated). The prestressing action is illustrated in FIG. 3 by an arrow 66.

The device 10 furthermore has a stop 68 with which the actuating element 24 interacts via a section 70 of the same if, in the event of a vehicle impact (crash situation), the pawl 20 exerts an opening torque (arrow 72 in FIG. 4) on the locking element 22.

Figure 4:
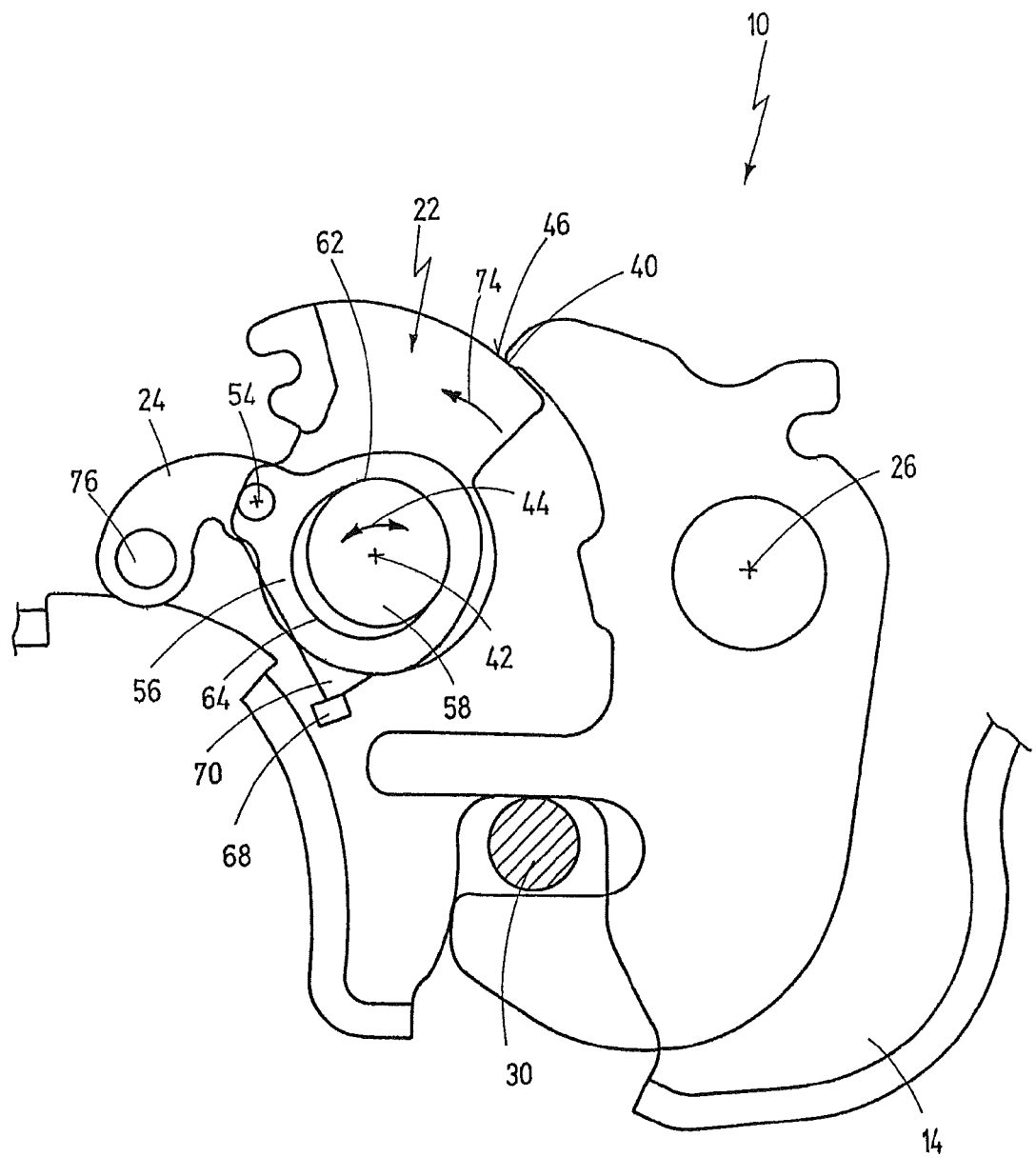
FIG. 4 shows a schematic illustration of the device in a further operating state.
Figure 5:
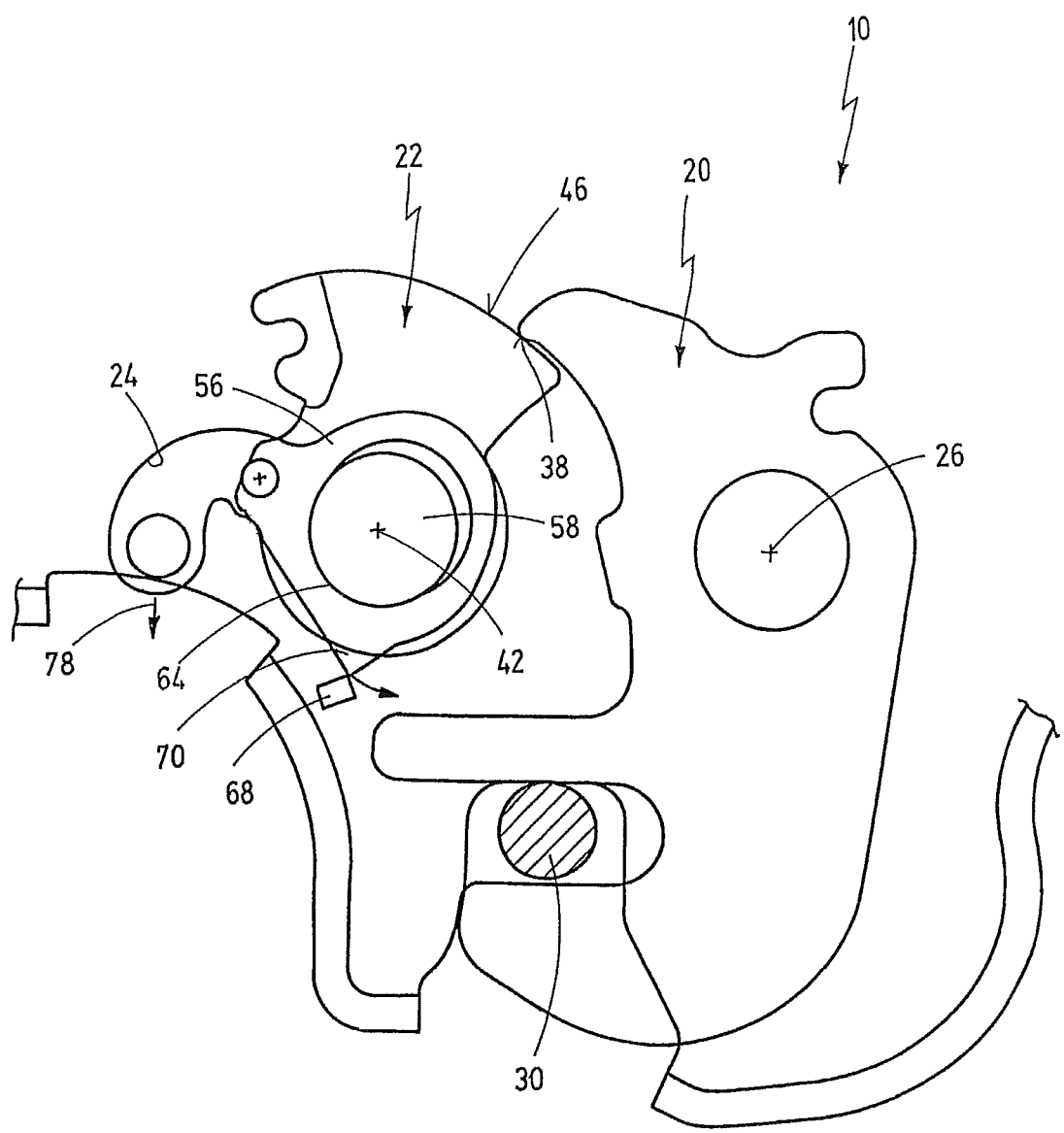
FIG. 5 shows a schematic illustration of the device in a further operating state.

If the actuating element 24 is in its inoperative position relative to the locking element 22, as illustrated in FIG. 3, and the pawl 20 brings about, by means of forces which suddenly occur, a torque which causes the locking element 22 to pivot in the direction of the arrow 74 in FIG. 4, the locking element 22, during its pivoting out of the locking position, carries along the actuating element 24 without a movement of the same relative to the locking element 22 until the section 70 of the actuating element 24 runs against the stop 68. Since the actuating element 24 cannot pivot in the direction of the arrow 66 in FIG. 3 because of the eye section 62 bearing against the bearing pin 58, the actuating element 24 blocks a further pivoting movement of the locking element 22 in the direction of the arrow 74. When the blocking action occurs, the clamping surface 46 of the locking element 22 still bears against the clamping surface 38 of the pawl 20, as a result of which the pawl also continues to remain in the closed position. As the torque which is exerted on the locking element 22 by the pawl 20 continues to act, the clamping surfaces 38 and 46 interlock or are calked further together such that the impact force is not solely absorbed by the stop 68 and the section 70, but rather to a substantial part also by the clamping surfaces 38 and 46.

In this case, the clamping surfaces 38 and 46 can even be calked together in a form-fitting manner by the material of the locking element 22 in the region of the clamping surface 46 being softer than the material of the pawl 20 in the region of the clamping surface 38 and of the projection 40. The projection 40 can therefore dig into the clamping surface 46 of the locking element 22 in a form-fitting manner in the event of high forces and, as a result, can no longer exert an opening torque on the locking element 22.

The pawl 20 has, at least in the region of its clamping surface 38 and of the projection 40, a material which preferably has a minimum yield point of 700 N/mm$^2$, preferably of approximately 900 N/mm$^2$. The tensile strength of said material preferably lies within the range of 1400 to 1600 N/mm$^2$. The hardness of said material preferably lies within the range of 400 to 500 HV (Vickers hardness) or in the range of 40-50 HRC (Rockwell hardness).

As material for the pawl 20, use is preferably made, at least in the region of its clamping surface 38, or furthermore preferably overall, of the material 42CrMo$_4$, a quenched and subsequently tempered steel according to DIN EN 10083.

By contrast, the locking element 22 has, at least in the region of its clamping surface 46, a material, the minimum yield point of which lies at around 400 N/mm$^2$, preferably at around 550 N/mm$^2$ and which has a tensile strength within the range of 500-800 N/mm$^2$. The hardness of said material preferably lies within the range of 160-250 HV (Vickers hardness). A preferred example of a material of this type is the material S550MC, a higher strength steel for cold forming which is thermomechanically rolled according to DIN EN 10149-2.

The operating state of the device 10 in the event of an impact is illustrated in FIG. 4. The impression of the projection 40 in the clamping surface 46 of the locking element 22 is also illustrated there by an interrupted line.

The device 10 functions in a different manner during an intended transfer of the pawl from the closed position, shown in FIG. 3, into the open position of the pawl 20, in which the pawl 20 releases the fitting 30.

During an intended opening of the pawl 20, the actuating element 24 is actuated in order to transfer the locking element 22 from its locking position (FIG. 3) into its unlocking position (FIG. 6). For this purpose, according to FIG. 2, a bolt 76 is arranged on the actuating element 24, on which bolt a tension or compression rod or another force-transmitting element (not illustrated) can act in order to actuate the actuating element 24 if the bolt 76 is not itself directly accessible for the hand.

If, starting from the inoperative position of the actuating element 24 relative to the locking element 22 according to FIG. 3, a force acts on the actuating element 24 in the direction of an arrow 78 in FIG. 3, this results first of all in the actuating element 24 pivoting about its pivot axis 54, to be precise over a pivoting distance which corresponds to the limited movement clearance of the actuating element 24 relative to the locking element 22. If the movement clearance counter to the prestressing of the actuating element 24 into its inoperative position is overcome, the eye section 64 bears against the pin 58. A further application of force to the actuating element 24 in the direction of the arrow 78 then leads to the locking element 22 being carried along by the actuating element 24 and therefore to a common pivoting of the actuating element 24 and of the locking element 22 about the pivot axis 42, but with the section 70 of the actuating element 24 now running past the stop 68. The section 70 now runs past the stop 68 because the actuating element 24 is displaced relative to the stop 68 and therefore the distance of the section 70 from the pivot axis 42 has been reduced by the actuating element 24 being pivoted forward about the pivot axis 54.

The actuating element 24 can now be pivoted, with the locking element 22 being carried along, about the pivot axis 42 until the locking element 22 reaches its unlocking position according to FIG. 6, in which the clamping surface 46 of the locking element 22 and the clamping surface 38 of the pawl 20 are completely separated from each other, and therefore the pawl can now pivot about the pivot axis 26 according to an arrow 80 in FIG. 6 in order to release the fitting 30, with said pivoting taking place automatically by means of the spring 50 between the locking element 22 and the pawl 20.

In the exemplary embodiment shown, the stop 68 is formed on the housing part 14, for example is formed integrally therewith or is connected thereto in a suitable manner.

The stop 68 should be designed in such a manner that it is capable of being able to absorb correspondingly high forces without breaking. However, the stop 68, as already described above, does not have to be designed in such a manner that, in the event of an impact, it has to be able to absorb the entire opening torque of the pawl 20, since the clamping surfaces 46 and 38 also absorb part of said opening force. The stop 68 merely has to ensure that it temporarily stops the locking element 22 in its undesired opening movement until the clamping surfaces 46 and 38 are calked together.

What is claimed, is:

1. A device for locking a vehicle seat, comprising
  a pawl pivotable about a first pivot axis and, in a closed position, being in engagement with a positionally fixed fitting and, in an open position, being free from said fitting,
  said pawl having a projection on which a first clamping surface is at least partially formed, said projection having a first material,
  a locking element for locking said pawl in said closed position, said locking element being pivotable about a second pivot axis and having a second clamping surface which, in a locking position, bears against said first clamping surface and, thereby, keeps said pawl in said closed position, and, in an unlocking position, is free from said first clamping surface, said locking element, in the region of said second clamping surface, having a second material which is softer than said first material which said pawl has in the region of said first clamping surface, so that the projection of the pawl bores into the second clamping surface of the locking element in the event of high opening torques being exerted by the pawl on the locking element in the event of an impact, an actuating element interacting with said locking element in order to transfer said locking element into said unlocking position, and a stop provided for said actuating element in such a manner that, upon action of a torque exerted by said pawl on said locking element, said actuating element interacts in a blocking manner with said stop and blocks further movement of said locking element before said locking element reaches said unlocking position, wherein the projection extends along a direction of pivoting movement of the pawl about the first pivot axis.

2. The device of claim 1, wherein said actuating element has a limited movement clearance relative to said locking element such that, upon actuation of said actuating element in order to unlock said locking element, said actuating element, after executing a relative movement limited by said movement clearance, runs past said stop, carrying along said locking element.

3. The device of claim 2, wherein said actuating element has a section which, in order to produce said movement clearance, sits with a clearance on a bearing pin of said locking element, which bearing pin forms said second pivot axis.

4. The device of claim 1, wherein said actuating element is connected to said locking element at a connecting point outside said second pivot axis.

5. The device of claim 4, wherein said actuating element can be pivoted about a third pivot axis, said third pivot axis being formed by said connecting point to said locking element.

6. The device of claim 1, wherein said actuating element is prestressed into a position relative to said locking element, in which position said actuating element interacts in a blocking manner with said stop upon action of a torque exerted by said pawl on said locking element.

7. The device of claim 1, wherein the stop is disposed remote from the pawl.

8. A device for locking a vehicle seat, comprising a pawl pivotable about a first pivot axis and, in a closed position, being in engagement with a positionally fixed fitting and, in an open position, being free from said fitting, said pawl having a projection on which a first clamping surface is at least partially formed, said projection having a first material, a locking element for locking said pawl in said closed position, said locking element being pivotable about a second pivot axis and having a second clamping surface which, in a locking position, bears against said first clamping surface and, thereby, keeps said pawl in said closed position, and, in an unlocking position, is free from said first clamping surface, said locking element, in the region of said second clamping surface, having a second material which is softer than said first material which said pawl has in the region of said first clamping surface, an actuating element interacting with said locking element in order to transfer said locking element into said unlocking position, and a stop provided for said actuating element in such a manner that, upon action of a torque exerted by said pawl on said locking element, said actuating element interacts in a blocking manner with said stop and blocks further movement of said locking element before said locking element reaches said unlocking position, wherein the projection extends along a direction of pivoting movement of the pawl about the first pivot axis, and wherein the stop is disposed remote from the pawl.

* * * * *